United States Patent
Fan et al.

(10) Patent No.: US 12,293,496 B2
(45) Date of Patent: May 6, 2025

(54) VIRTUAL REALITY DISPLAY METHOD, DEVICE AND STORAGE MEDIUM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Qingwen Fan, Beijing (CN); Jinghua Miao, Beijing (CN); Wenyu Li, Beijing (CN); Hao Zhang, Beijing (CN); Lili Chen, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 220 days.

(21) Appl. No.: 18/004,173

(22) PCT Filed: Sep. 13, 2021

(86) PCT No.: PCT/CN2021/117987
§ 371 (c)(1),
(2) Date: Jan. 3, 2023

(87) PCT Pub. No.: WO2022/089046
PCT Pub. Date: May 5, 2022

(65) Prior Publication Data
US 2023/0267578 A1     Aug. 24, 2023

(30) Foreign Application Priority Data

Oct. 29, 2020 (CN) .......................... 202011177945.2

(51) Int. Cl.
*G06T 5/80* (2024.01)
*G02B 27/01* (2006.01)
(Continued)

(52) U.S. Cl.
CPC .............. *G06T 5/80* (2024.01); *G02B 27/017* (2013.01); *G06F 3/1431* (2013.01); *G06F 3/011* (2013.01);
(Continued)

(58) Field of Classification Search
CPC ....... G06T 5/80; G06T 15/005; G06T 19/006; G06T 2200/04; G02B 27/017;
(Continued)

(56) References Cited

U.S. PATENT DOCUMENTS 5,821,989 A * 10/1998 Lazzaro ............... H04N 9/3141
348/E13.058
2011/0188580 A1 * 8/2011 Valmiki ............... H04N 19/436
375/240.24
(Continued)

FOREIGN PATENT DOCUMENTS

| CN | 105892683 A | 8/2016 |
| CN | 105979243 A | 9/2016 |

(Continued)

OTHER PUBLICATIONS

"Side talk about hardware and talk about asynchronous time warning in VR," CSDN Blog Website, Available Online at https://blog.csdn.net/messi_cyc/article/details/77866663, Sep. 6, 2017, 18 pages. (Submitted with English X Translation).
(Continued)

*Primary Examiner* — YuJang Tswei
(74) *Attorney, Agent, or Firm* — McCoy Russell LLP

(57) ABSTRACT

A virtual reality display method and apparatus, and a storage medium are provided. The virtual reality display method
(Continued)

includes: rendering display data of a plurality of screens in sequence by utilizing one thread of at least two threads, and after rendering the display data of the plurality of screens, correcting the rendered display data by using the at least two threads.

16 Claims, 4 Drawing Sheets

(51) Int. Cl.
    *G06F 3/01*         (2006.01)
    *G06F 3/14*         (2006.01)
    *G06T 15/00*       (2011.01)
    *G06T 19/00*       (2011.01)
    *G09G 5/12*         (2006.01)
    *G09G 5/36*         (2006.01)

(52) U.S. Cl.
    CPC ............ *G06F 3/012* (2013.01); *G06F 3/1438* (2013.01); *G06T 15/005* (2013.01); *G06T 19/006* (2013.01); *G06T 2200/04* (2013.01); *G09G 5/12* (2013.01); *G09G 5/363* (2013.01); *G09G 2352/00* (2013.01); *G09G 2360/06* (2013.01)

(58) Field of Classification Search
    CPC ........ G06F 3/1431; G06F 3/011; G06F 3/012; G06F 3/1438; G09G 5/363; G09G 5/12; G09G 2352/00; G09G 2360/06
    See application file for complete search history.

(56) References Cited

U.S. PATENT DOCUMENTS

| | | | |
|---|---|---|---|
| 2011/0280307 A1* | 11/2011 | MacInnis | H04N 5/44504 375/240.15 |
| 2017/0178408 A1 | 6/2017 | Bavor, Jr. et al. | |
| 2017/0243324 A1 | 8/2017 | Mierle et al. | |
| 2017/0309233 A1 | 10/2017 | Patel et al. | |
| 2018/0039317 A1* | 2/2018 | Riguer | G06F 1/3243 |
| 2018/0300096 A1 | 10/2018 | Asperheim et al. | |
| 2019/0180405 A1* | 6/2019 | Prest | G06F 9/50 |
| 2019/0279427 A1 | 9/2019 | Tang et al. | |
| 2019/0333263 A1* | 10/2019 | Melkote Krishnaprasad | G06F 3/012 |
| 2020/0104975 A1 | 4/2020 | Banerjee et al. | |
| 2020/0105050 A1 | 4/2020 | Fan et al. | |
| 2020/0193566 A1 | 6/2020 | Croxford | |
| 2020/0279533 A1 | 9/2020 | Fan et al. | |
| 2021/0213973 A1* | 7/2021 | Carillo Peña | G06N 3/08 |
| 2021/0360330 A1* | 11/2021 | Stockhammer | H04N 21/816 |

FOREIGN PATENT DOCUMENTS

| | | |
|---|---|---|
| CN | 106296566 A | 1/2017 |
| CN | 106658170 A | 5/2017 |
| CN | 107220925 A | 9/2017 |
| CN | 108139815 A | 6/2018 |
| CN | 108632598 A | 10/2018 |
| CN | 108921951 A | 11/2018 |
| CN | 109242944 A | 1/2019 |
| CN | 109887065 A | 6/2019 |
| CN | 109920040 A | 6/2019 |
| CN | 110969706 A | 4/2020 |
| CN | 112230776 A | 1/2021 |

OTHER PUBLICATIONS

ISA China National Intellectual Property Administration, International Search Report and Written Opinion Issued in Application No. PCT/CN2021/117987, Dec. 2, 2021, WIPO, 18 pages.

China National Intellectual Property Administration, Office Action and Search Report Issued in Application No. 202011177945.2, Jun. 7, 2023, 12 pages. (Submitted with Partial English Translation).

* cited by examiner

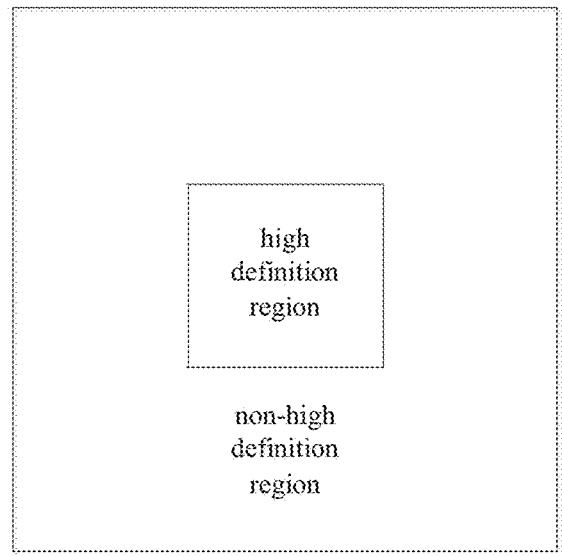

Fig.4

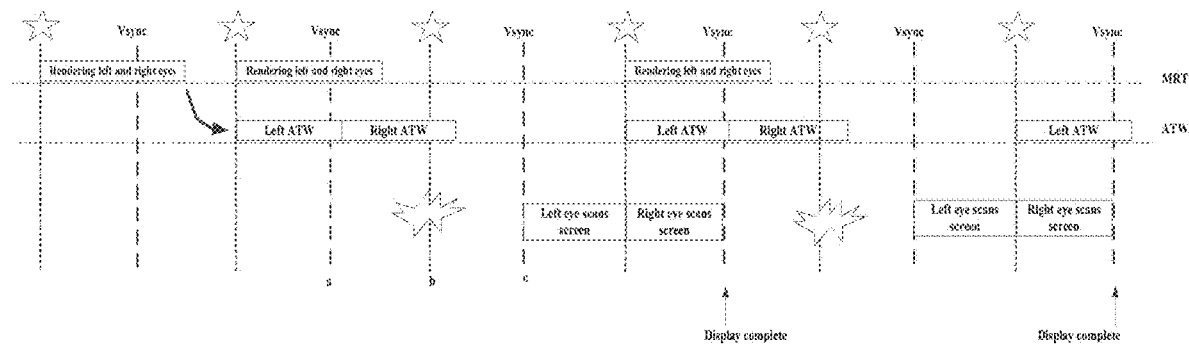

Fig.5

```
┌─────────────────────────────────────────────────────────────────┐  ___101
│ rendering the display data of the plurality of screens in sequence by utilizing one │
│                    thread of at least two threads                │
└─────────────────────────────────────────────────────────────────┘
                                 │
                                 ▼
┌─────────────────────────────────────────────────────────────────┐  ___102
│ after rendering the display data of the plurality of screens, correcting the rendered │
│              display data by using the at least two threads     │
└─────────────────────────────────────────────────────────────────┘
```

Fig.6

VIRTUAL REALITY DISPLAY METHOD, DEVICE AND STORAGE MEDIUM

CROSS REFERENCE TO RELATED APPLICATIONS

The present application is a U.S. National Phase of International Application No. PCT/CN2021/117987, entitled "VIRTUAL REALITY DISPLAY METHOD, DEVICE AND STORAGE MEDIUM", and filed on Sep. 13, 2021. International Application No. PCT/CN2021/117987 claims priority to Chinese Patent Application No. 202011177945.2 filed on Oct. 29, 2020. The entire contents of each of the above-listed applications are hereby incorporated by reference for all purposes.

TECHNICAL FIELD

The present disclosure relates to the field of display technologies, and in particular, to a virtual reality display method and apparatus, and a storage medium.

BACKGROUND

Virtual Reality (VR) system is a computer simulation system that can create and experience a Virtual world by fusing multi-source information to provide an interactive three-dimensional dynamic view to a user and by simulating user behavior to immerse the user into the simulated environment. The virtual reality technology comprises various aspects such as environment simulation technology, user behavior perception technology and the like. The environment simulation technology is to generate real-time dynamic three-dimensional vivid images through a computer. The user behavior perception technology means that an ideal virtual reality system can know all perceptions of a user. In addition to visual perception generated by computer graphics technology, there are also perceptions such as auditory sensation, touch sensation, force sensation, and movement, and even olfactory sensation and taste sensation, which are also called multi-perception.

The widespread deployment of virtual reality technology requires that virtual reality applications can maintain a higher frame rate to provide more real-time three-dimensional stereoscopic images.

SUMMARY

According to at least one embodiment of the present disclosure, there is provided a virtual reality display method including:
rendering the display data of the plurality of screens in sequence by utilizing one thread of at least two threads;
and after rendering the display data of the plurality of screens, correcting the rendered display data by using the at least two threads.

In some embodiments, the at least two threads include a first thread and a second thread, and the multiple screens include a first screen and a second screen, and the method specifically includes:
executing the first thread to render the first screen display data and the second screen display data in sequence;
after the first screen display data are rendered, the second thread is executed to correct the rendered first screen display data to obtain first screen display correction data; and after the second screen display data is rendered, executing the first thread to correct the rendered second screen display data to obtain second screen display correction data.

In some embodiments, the first thread and the second thread are selected from a rendering thread and a data correction thread, and the first thread is different from the second thread.

In some embodiments, before executing the first thread to render the second screen display data, the method further comprises:
acquiring a vertical synchronization signal;
if the vertical synchronizing signal is an odd-bit vertical synchronizing signal, the first thread is a rendering thread; if the vertical synchronizing signal is an even-bit vertical synchronizing signal, the first thread is a data correction thread; or
If the vertical synchronizing signal is an even-bit vertical synchronizing signal, the first thread is a rendering thread; if the vertical synchronization signal is an odd-bit vertical synchronization signal, the first thread is a data correction thread.

In some embodiments, after executing the second thread to correct the rendered first screen display data and obtaining first screen display correction data, the method further includes:
and executing the second thread to send the first screen display correction data to the first thread.

In some embodiments, after executing the second thread to send the first screen display correction data to the first thread, the method further comprises:
and executing the first thread to send the first screen display correction data and the second screen display correction data to a display cache for screen display.

In some embodiments, the first thread and the second thread are performed in parallel to obtain the first screen display correction data and the second screen display correction data.

In some embodiments, the rendering of the first screen display data and the second screen display data is a multi-render-target rendering.

In some embodiments, the executing the first thread to render the first screen display data and the second screen display data sequentially further includes:
first user pose data after a first predetermined amount of time for a display refresh frame is predicted, and rendering is performed based on the first user pose data to obtain the rendered first and second screen display data.

In some embodiments, the corrected output frequency of the display data is not less than 90% of the input frequency of the display data.

In some embodiments, further comprising:
predicting second user pose data for a beginning node of a display frame of the first screen display data and the second screen display data and third user pose data for an ending node of the display frame;
executing the second thread to correct the rendered first screen display data includes: correcting the rendered first screen display data based on the second user posture data and the third user posture data to obtain first screen display correction data;
executing the first thread to correct the rendered second screen display data includes: and correcting the rendered second screen display data based on the second user posture data and the third user posture data to obtain second screen display correction data.

In some embodiments, correcting the rendered first screen display data and second screen display data based on the second user pose data and the third user pose data comprises:
  interpolating the second user pose data and the third user pose data to obtain first asynchronous time warp correction reference data, and then correcting the rendered first screen display data and second screen display correction data based on the first asynchronous time warp correction reference data.

There is also provided in accordance with at least one embodiment of the present disclosure a virtual reality display device including:
  a plurality of screens;
  the processor is used for rendering the display data of the plurality of screens by utilizing one thread of at least two threads;
  and after rendering the display data of the plurality of screens, correcting the rendered display data by using the at least two threads.

In some embodiments, the at least two threads include a first thread and a second thread, the plurality of screens include a first screen and a second screen,
  the processor is further configured to execute the first thread to render the first screen display data and the second screen display data in sequence; after the first screen display data are rendered, the second thread is executed to correct the rendered first screen display data to obtain first screen display correction data; and after the second screen display data is rendered, executing the first thread to correct the rendered second screen display data to obtain second screen display correction data.

In some embodiments, further comprising:
  a clock generator configured to generate a vertical synchronization signal;
  the processor is further configured to obtain a vertical synchronization signal, execute the first thread and the second thread based on the vertical synchronization signal, and if the vertical synchronization signal is an odd-numbered vertical synchronization signal, the first thread is a rendering thread; if the vertical synchronizing signal is an even-bit vertical synchronizing signal, the first thread is a data correction thread; or, if the vertical synchronization signal is an even-bit vertical synchronization signal, the first thread is a rendering thread; if the vertical synchronization signal is an odd-bit vertical synchronization signal, the first thread is a data correction thread.

In some embodiments, the processor is further configured to execute the second thread to send the first screen display correction data to the first thread.

In some embodiments, the processor is further configured to execute the first thread to send the first screen display correction data and the second screen display correction data to a display buffer for screen display.

There is also provided in accordance with at least one embodiment of the present disclosure a virtual reality display device including: a processor and a memory, the memory storing computer-executable instructions that, when executed by the processor, perform the virtual reality display method as described above.

There is also provided in accordance with at least one embodiment of the present disclosure a computer-readable storage medium storing computer-executable instructions, wherein the computer-executable instructions, when executed by a processor, perform the virtual reality display method as described above.

BRIEF DESCRIPTION OF THE DRAWINGS

FIG. 4 is a schematic diagram of an image divided into high definition and non-high definition regions;

FIG. 5 is a schematic diagram of a dropped frame;

FIG. 6 is a schematic flow chart diagram illustrating a virtual reality display method according to an embodiment of the disclosure;

DETAILED DESCRIPTION

Figure 1:
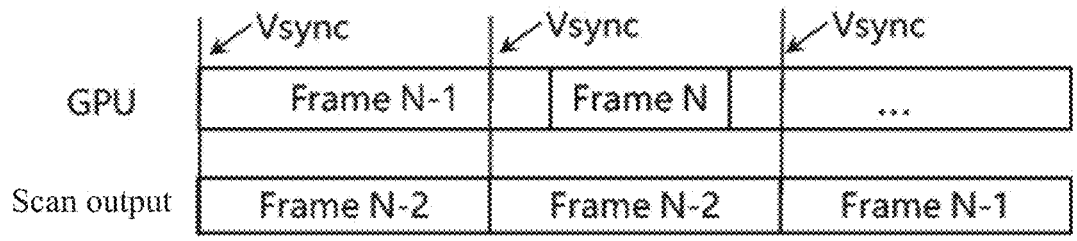
FIG. 1 is a schematic diagram of no new rendering frame output when a synchronization signal Vsync arrives.

In order to make the objects, technical solutions, and advantages of the present disclosure more apparent, example embodiments according to the present disclosure will be described in detail below with reference to the accompanying drawings. It should be understood that the described embodiments are only some of the embodiments of the present disclosure, and not all of the embodiments of the present disclosure, and it is to be understood that the present disclosure is not limited by the example embodiments described herein. All other embodiments, which can be derived by a person skilled in the art from the embodiments of the disclosure described in the disclosure without inventive step, shall fall within the scope of protection of the disclosure.

It is to be noted that in the present specification and the drawings, steps and elements having substantially the same meaning are denoted by the same reference numerals, and repeated description of the steps and elements will be omitted.

According to an example embodiment, the virtual reality system may include, for example, head mounted devices, such as virtual reality helmets, virtual reality glasses, etc., to generate an immersive virtual world environment from the user's actions, perception, etc. information. However, when using a virtual reality head mounted device, if the user moves too fast, a delay in scene rendering will result. For example, when the user turns his head quickly, although the user's head has turned past a predetermined position to reach a new position, an image corresponding to the predetermined position has not been rendered yet, or the rendered image is still an image of the previous frame, and thus the image seen by the user does not coincide with the image of the new position expected by the user, resulting in a delay in displaying the image and a feeling of vertigo of the user.

To reduce rendering image latency in a display scene, partial virtual reality devices employ Time Warping (TW) techniques. The time warping technique is a technique of modifying an image frame, which solves a scene rendering delay problem by warping (or correcting) scene data after rendering based on a change in a user's motion after rendering. Since the time-warping process is performed at a time closer to the display time, the time-warping process results in a new display image closer to the image that the user wishes to see. Meanwhile, since the time warping technique is only processing a two-dimensional image, it is similar to affine transformation in image processing, and it does not bring excessive system workload overhead.

Figure 2:
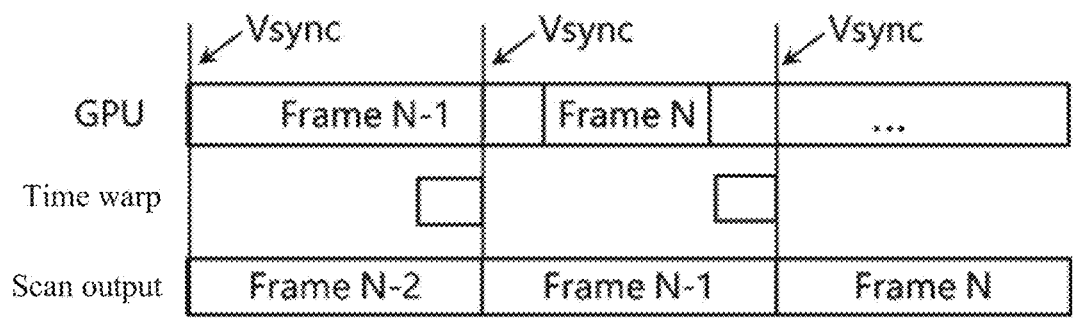
FIG. 2 is a schematic diagram of an asynchronous process generating a new frame based on the most recently completed frame of the rendering process before each vertical synchronization.

Asynchronous Time Warping (ATW), the time warping technique described above, which schedules rendering and time warping separately in two different threads, so that the rendering and time warping steps can be performed asynchronously, thereby reducing the overall runtime of the rendering and time warping processes. For example, when the virtual reality application cannot maintain a sufficient frame rate, the asynchronous time warping thread may reprocess the previous rendered scene data according to the current user gesture to generate a frame picture (intermediate frame) conforming to the current user gesture, so as to reduce the jitter of the picture and better reduce the delay. The technology is the most critical technology for reducing delay and solving vertigo. Without ATW technology, as shown in FIG. 1, if no new rendering Frame is output when the synchronization signal Vsync arrives, that is, the GPU (Graphics Processing Unit) cannot render the image of Frame (Frame) N−1 completely, the data of Frame (Frame) N−2 in the previous Frame will be displayed twice, and this will not generate an abnormal phenomenon when the user keeps the head motion still. However, when the user rotates from the old head position to the new position, the image corresponding to the old head position is still displayed on the screen at this time. At this time, the brain response has switched to the new head position, but the eyes receive the content of the old head position, the mismatch of the two information can cause the user to feel dizzy, and the bigger the rotation angle is, the stronger the dizzy feeling is. Asynchronous time warping before each vertical synchronization, an asynchronous process generates a new frame according to the frame which is completed by the rendering process most recently as shown in FIG. 2, when no new rendering frame is output when the synchronous signal Vsync arrives, that is, when the GPU cannot render the image of frame-1 completely, the frame data corresponding to the new head position is generated by correcting the image of frame-2 (scanning and outputting the corresponding frame-1), and by this method, it is ensured that a new frame is generated according to the latest head position before each Vsync signal arrives, so that the vertigo feeling of the user can be reduced to a greater extent, and the comfort level of the VR product of the user can be improved.

Figure 3:
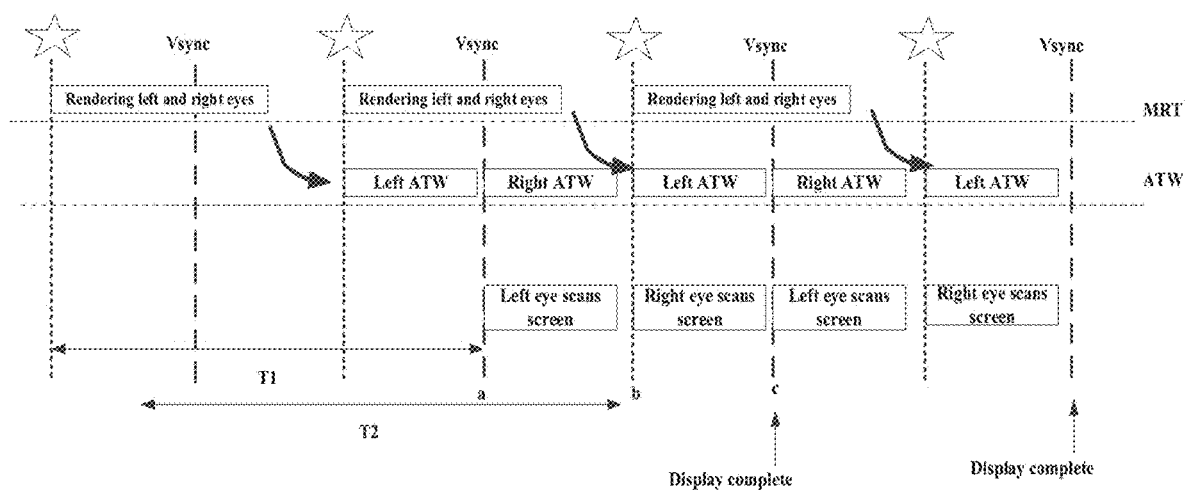
FIG. 3 is a schematic diagram of synchronous operation of an asynchronous time-warp thread and a rendering thread.

Under the premise that the traditional mobile-end VR system refreshes a display mechanism, asynchronous time warping is processed in one thread (called ATW thread), and the thread and a rendering thread (called MRT thread) run synchronously. As shown in FIG. 3, when acquiring Vsync signal, MRT thread renders the scene to be displayed, the rendered scene mainly depends on the pose data of the user after 1.5 frames predicted by Sensor, and ATW thread corrects and distorts the image frames of left and right eyes respectively based on the pose prediction of the scene rendered by MRT thread at a close time point, that is, when ATW acquires the scene data transmitted by MRT thread, ATW interpolates the pose data of the user predicted by Sensor to determine the pose data for ATW processing of the left eye image. At the time when the Vsync signal is acquired, the pose data for the ATW processing of the right-eye image is determined by interpolation based on the pose predicted by the Sensor, and a flowchart thereof is shown in FIG. 3. It can be seen that, in the VR system refresh display mechanism, a total time of 2.5 frames is consumed from the acquisition of the gesture of the user to the final display of the image to the screen.

Analyzing based on the current high-resolution VR product and VR application, and improving the resolution of a fixation point area for improving the display effect, as shown in FIG. 4, dividing an image into a high-definition area and a non-high-definition area, and then performing operations of high-definition area and non-high-definition area image taking, high-definition image and non-high-definition image anti-distortion, high-definition image LD (LocalDimming) processing, full-field image LD (LocalDimming) processing, high-definition image and full-field LD image splicing, and fixation point writing in the VR system; compared with the traditional VR system, high-definition region image taking is added in the MRT stage, high-definition image anti-distortion, high-definition image and non-high-definition image LD processing, high-definition region and non-high-definition LD image splicing and dynamic fixation point writing are added in the ATW stage; when the method is applied to a mobile terminal display product, due to the limited computing capability of the mobile terminal, after the resolution of an image is improved, the time consumption of an ATW stage is obviously increased, so that the phenomena of serious frame dropping of an all-in-one machine frame rate and tearing of a picture occur, as shown in FIG. 5; compared with the traditional VR system, the time for processing the MRT and the ATW is increased, but the left-eye and right-eye rendering time in the MRT stage can still ensure that the processing is completed within one frame, and the rendering time of the monocular ATW, which is different from the previous rendering time, can be controlled within a half frame, so that the frame rate is sharply reduced.

The embodiment of the disclosure provides a virtual reality display method and device, which can improve the frame dropping phenomenon shown in FIG. 5, shorten the rendering time and the display time of the rendered image by adjusting the starting time of rendering left and right eyes, and reduce the delay between the rendering of the left and right eye images and the display.

According to at least one embodiment of the present disclosure, there is provided a virtual reality display method, as shown in FIG. 6, including:

step 101: rendering the display data of the plurality of screens in sequence by utilizing one thread of at least two threads;

step 102: after rendering the display data of the plurality of screens, correcting the rendered display data by using the at least two threads.

In this embodiment, after rendering the display data of multiple screens, the rendered display data is corrected by using at least two threads, instead of correcting the rendered display data by using one thread, so that the time of using multiple threads can be maximized, the performance of the current processor is fully utilized, and the frame drop phenomenon is greatly improved.

The at least two threads may include two threads or three threads or more, the multiple screens may include two screens or three screens or more, and the display data of the multiple screens are different from each other.

In this embodiment, the step of rendering the display data of the multiple screens in sequence by using one thread of the at least two threads means that the display data of the first screen is rendered by using the thread, then the display data of the second screen is rendered, then the display data of the third screen is rendered, and so on, and the rendering of the display data of the multiple screens is completed in sequence.

The virtual reality display method of the embodiment of the disclosure can comprise two threads running in parallel, namely a first thread and a second thread. For example, the virtual reality display method may be applied to a virtual reality display device or an augmented reality display device including a left-eye display screen and a right-eye display screen, such as a virtual display helmet, an augmented reality display helmet, and the like, which may further include a motion sensor such as a gyroscope, an acceleration sensor, and the like, a Central Processing Unit (CPU), a memory, an image processing unit (GPU), a communication device, and the like. The method may be executed, for example, by a central processing unit or an image processing unit for the virtual reality display device, which may employ various suitable operating systems, such as an android (add roid) system, a Linux system, a Unix system, or a Windows (Windows) system, And the following takes the android system as an example, but the embodiment of the present disclosure is not limited thereto.

In an embodiment, the at least two threads include a first thread and a second thread, the multiple screens include a first screen and a second screen, and the method specifically includes:

executing the first thread to render the first screen display data and the second screen display data in sequence;

after the first screen display data are rendered, the second thread is executed to correct the rendered first screen display data to obtain first screen display correction data; and after the second screen display data is rendered, executing the first thread to correct the rendered second screen display data to obtain second screen display correction data.

In this embodiment, the rendered first screen display data is not corrected until the first thread renders the second screen display data, but the second thread is executed to correct the rendered first screen display data after the first thread renders the first screen display data, and the first thread is executed to correct the rendered second screen display data after the first thread renders the second screen display data, so that the time of each frame of two threads can be maximally utilized, rendering and image correction are completed before image throwing operation of each frame, the performance of a current processor is fully utilized, and the frame drop phenomenon is greatly improved; and by adjusting the rendering starting time, the rendering time is shortened from the time when the rendered image is displayed, and the time delay between the rendering and the display of the image is reduced.

The first screen display data and the second screen display data are, for example, pre-stored image data read from a storage device, for example, for a virtual reality display device, the pre-stored image data includes image data of a corresponding application, for example, image data of a tour museum, a race track of a racing game, and the like.

Optionally, the first screen may be a screen displaying an image seen by the left eye of the user, and the second screen may be a screen displaying an image seen by the right eye of the user. The first screen display data may include various parameters of objects that should be presented in the field of view of the left eye of the user, and the second screen display data may include various parameters of objects that should be presented in the field of view of the right eye of the user.

As described above, the meanings of the first screen and the second screen may be interchanged, and the first screen and the second screen may be various types of display screens, for example, a Liquid Crystal Display (LCD), an organic light emitting diode display (OLED), a Micro-LED display, or the like. These display devices implement refreshing of a display image of one frame by, for example, progressive scanning or the like.

In order to make the image presented by the virtual reality device be all objects that the user can observe in the visual field when the user uses the virtual reality device, all objects in the visual field of the user are generally rendered. Meanwhile, different images need to be presented to the left eye and the right eye of the user (i.e., parallax is formed), and then the brain of the user synthesizes the different images of the left eye and the right eye, so that the image with stereoscopic impression is presented to the user. Thus, the first screen display data and the second screen display data may differ in parameters for the same object. For example, the position of the object viewed by the left and right eyes for the same object, and the case where light is refracted to the left and right eyes through the object may also be different, and thus, in the present disclosure, both the first screen display data and the second screen display data are rendered. By adopting the mode, compared with the mode that the whole object is rendered firstly and then the rendering output result is output to the first screen and the second screen through affine transformation, the method can obtain more accurate images with stronger stereoscopic impression.

In this embodiment, the first thread and the second thread are selected from a rendering thread and a data correction thread, and the first thread is different from the second thread. Wherein the data correction thread may be the asynchronous time-warping described above.

Optionally, the rendering of the first screen display data and the second screen display data is a multi-render-target rendering.

The multi-render target rendering technique may save data of multiple pixels into different buffers (e.g., a buffer for color mapping, a buffer for normal mapping, and a buffer for depth mapping) so that these data become parameters of a subsequent lighting effect shader, so that the fineness of the output image is improved. By the multi-rendering-target rendering technology, the rendering of the illumination information can be delayed, and the rendering processing speed is improved. Meanwhile, since the first screen display data and the second screen display data are rendered respectively, it is necessary to store the pixel data of each object in the first screen display data and the second screen display data to the cache region, and then analyze the data in the illumination effect rendering process, thereby enhancing the illumination effect of the images displayed in the first screen and the second screen. Compared with the conventional method of respectively performing illumination coloring calculation on each pixel in the whole scene by using an illumination color machine, in the embodiment of the disclosure, the multiple rendering target rendering on the first screen display data and the second screen display data respectively can reduce the operation times of the illumination coloring calculation performed by the processor, and can obtain an image with enhanced illumination effect.

In this embodiment, before the first thread is executed to render the second screen display data, the method further includes: a vertical synchronization signal is acquired. The first thread and the second thread can render the first screen display data and the second screen display data according to the vertical synchronization signal, so that pictures which a user wants to see are obtained, and the synchronism of the first screen display and the second screen display can be increased. Specifically, a Vertical synchronization (Vsync) signal is a synchronization signal applied between two frames to the display device, which indicates the end of the previous frame and the start of the next frame. This signal is active once before each frame scan, from which the field frequency of the display device, i.e. the number of refreshes of the screen per second, also referred to as the refresh frequency of the display device, can be determined. For example, the refresh frequency of the display device may be 60 Hz, 120 Hz, etc., i.e., 60, 120, etc. refreshes per second, with one display frame time being $\frac{1}{60}$ seconds, $\frac{1}{120}$ seconds, etc. The vertical synchronization signal is generated by a display driving device (e.g., a video card), and is used to synchronize a gate driving signal, a data signal, and the like required for displaying a frame of picture in a display process.

In some embodiments, the vertical synchronization signal sent by the system is divided into odd and even, and if the vertical synchronization signal is an odd-bit vertical synchronization signal, the first thread is a rendering thread; if the vertical synchronizing signal is an even-bit vertical synchronizing signal, the first thread is a data correction thread; or, if the vertical synchronization signal is an even-bit vertical synchronization signal, the first thread is a rendering thread; if the vertical synchronization signal is an odd-bit vertical synchronization signal, the first thread is a data correction thread.

Specifically, taking the data correction thread as an asynchronous time warping thread as an example, if the vertical synchronization signal is an odd-bit vertical synchronization signal, the first thread is a rendering thread, and the second thread is an asynchronous time warping thread; if the vertical synchronization signal is an even-bit vertical synchronization signal, the first thread is an asynchronous time warping thread, and the second thread is a rendering thread; when the vertical synchronization signal is an odd-numbered vertical synchronization signal, rendering the first screen display data and the second screen display data in sequence by using a rendering thread, after the first screen display data is rendered, correcting the rendered first screen display data by using an asynchronous time warping thread to obtain first screen display correction data, and after the second screen display data is rendered, performing the rendering thread to correct the rendered second screen display data to obtain second screen display correction data; if the vertical synchronizing signal is an even-bit vertical synchronizing signal, an asynchronous time warping thread is executed to render the first screen display data and the second screen display data in sequence, after the first screen display data is rendered, the rendering thread is executed to correct the rendered first screen display data to obtain first screen display correction data, and after the second screen display data is rendered, the asynchronous time warping thread is executed to correct the rendered second screen display data to obtain second screen display correction data. Therefore, by adjusting the running mechanisms of the rendering thread and the asynchronous time warping thread, different processing operations are distributed to the MRT thread and the ATW thread in the odd-even frame, the time of each frame of the two threads is maximally utilized under the condition that the ATW exceeds the half frame time, rendering and image correction are completed before the image throwing operation of each frame, the performance of the current AP processor can be fully utilized, the frame dropping phenomenon shown in the FIG. 5 is improved to the maximum extent, and the rendering time is shortened from the rendering time to the display time of the rendered image by adjusting the starting time of the left and right rendering eyes.

In another specific example, the following may also be: if the vertical synchronization signal is an even-bit vertical synchronization signal, the first thread is a rendering thread, and the second thread is an asynchronous time warping thread; if the vertical synchronization signal is an odd-bit vertical synchronization signal, the first thread is an asynchronous time-warping thread, and the second thread is a rendering thread. When the vertical synchronization signal is an even-bit vertical synchronization signal, rendering the first screen display data and the second screen display data in sequence by using the rendering thread, after the first screen display data is rendered, correcting the rendered first screen display data by using the asynchronous time warping thread to obtain first screen display correction data, and after the second screen display data is rendered, performing the rendering thread to correct the rendered second screen display data to obtain second screen display correction data; if the vertical synchronizing signal is an odd-numbered vertical synchronizing signal, an asynchronous time warping thread is executed to render the first screen display data and the second screen display data in sequence, after the first screen display data is rendered, the rendering thread is executed to correct the rendered first screen display data to obtain first screen display correction data, and after the second screen display data is rendered, the asynchronous time warping thread is executed to correct the rendered second screen display data to obtain second screen display correction data. Therefore, by adjusting the running mechanisms of the rendering thread and the asynchronous time warping thread, different processing operations are distributed to the MRT thread and the ATW thread in the odd-even frame, the time of each frame of the two threads is maximally utilized under the condition that the ATW exceeds the half frame time, rendering and image correction are completed before the image throwing operation of each frame, the performance of the current AP processor can be fully utilized, the frame dropping phenomenon shown in the FIG. 5 is improved to the maximum extent, and the rendering time is shortened from the rendering time to the display time of the rendered image by adjusting the starting time of the left and right rendering eyes.

In some embodiments, after the executing the second thread to correct the rendered first screen display data and the first screen display correction data is obtained, the method further includes:

executing the second thread to send the first screen display correction data to the first thread. The first thread can obtain the second screen display correction data and the first screen display correction data so as to output the second screen display correction data and the first screen display correction data to the display screen for display.

In some embodiments, after executing the second thread to send the first screen display correction data to the first thread, the method further comprises:

executing the first thread to send the first screen display correction data and the second screen display correction data to a display cache for screen display.

In some embodiments, the first thread and the second thread are performed in parallel to obtain the first screen display correction data and the second screen display correction data. Therefore, the total running time of the first thread and the second thread can be further reduced, the rendering time is shortened from the time when the rendered image is displayed, and the delay problem is relieved.

In some embodiments, the executing the first thread to render the first screen display data and the second screen display data sequentially further includes:

first user pose data after a first predetermined amount of time for a display refresh frame is predicted, and rendering is performed based on the first user pose data to obtain the rendered first and second screen display data.

The above-mentioned prediction operation may be, for example, by analyzing motion data fed back by a motion sensor such as an acceleration sensor, a gyroscope, or the like, obtaining a motion state of the head of the user at present, such as a motion direction, a velocity, an acceleration, or the like, and further predicting a position that the user will reach at a next predetermined time point, thereby predicting an image that the user will see. For example, the first user pose data, as well as other user pose data referred to in the description below, may include one or a combination of direction and angle in which the user is facing, direction and angle of motion, velocity, acceleration, and the like. For example, in the embodiment of the present disclosure, the prediction operation may be performed by calculating or predicting the user gesture after a given time according to the current user gesture and the historical data of the user gesture, so as to obtain the user gesture data of the time to be displayed. Methods of calculation or prediction include, but are not limited to, prediction using neural networks.

Optionally, the first predetermined amount of display refresh frames is N+0.5 display refresh frames, where N is greater than or equal to 1. Here, the term "display refresh frame" refers to a frame of the corresponding display device during the scanning process for displaying, and is also referred to as "frame" hereinafter.

The value of N may be different based on a statistical result of rendering time and Asynchronous Time Warping (ATW) processing time for one frame of a display screen of a currently used virtual reality device. The values of N mentioned above are only examples. The value of N may be a fixed value determined according to the performance of the CPU, and may also be dynamically adjusted based on the actual usage of the current virtual reality device. For example, in the case where the CPU of the virtual reality device is computationally expensive and/or other threads occupy significant CPU resources, the rendering thread may take longer to process. In such a case, the value of N may be dynamically adjusted to a larger value so that the rendered display data is closer to the time at which it should be displayed. Similarly, the value of N may be dynamically adjusted to a smaller value when the amount of computation of the CPU of the virtual reality device is smaller and/or other threads occupy smaller CPU resources.

In some embodiments, the method further comprises:
predicting second user pose data for a beginning node of a display frame of the first screen display data and the second screen display data and third user pose data for an ending node of the display frame;
executing the second thread to correct the rendered first screen display data includes: correcting the rendered first screen display data based on the second user posture data and the third user posture data to obtain first screen display correction data;
executing the first thread to correct the rendered second screen display data includes: and correcting the rendered second screen display data based on the second user posture data and the third user posture data to obtain second screen display correction data.

In some embodiments, correcting the rendered first screen display data and second screen display data based on the second user pose data and the third user pose data comprises:
interpolating the second user pose data and the third user pose data to obtain first asynchronous time warp correction reference data, and then correcting the rendered first screen display data and second screen display correction data based on the first asynchronous time warp correction reference data.

Therefore, the scene images output by the first screen and the second screen are closer to the picture expected by the user, and the tearing feeling of the picture is reduced.

At present, the processors of the mobile terminal are basically configured by multi-core multi-processor, for example, processors of various versions of ARM architecture, but of course, processors of various versions of X86 architecture, etc. may also be used. In order to more fully utilize the performance of each processor, the virtual reality display method according to some embodiments of the disclosure can adjust the running processes of the rendering thread and the ATW thread during the running process of the mobile-end virtual reality application.

Figure 7:
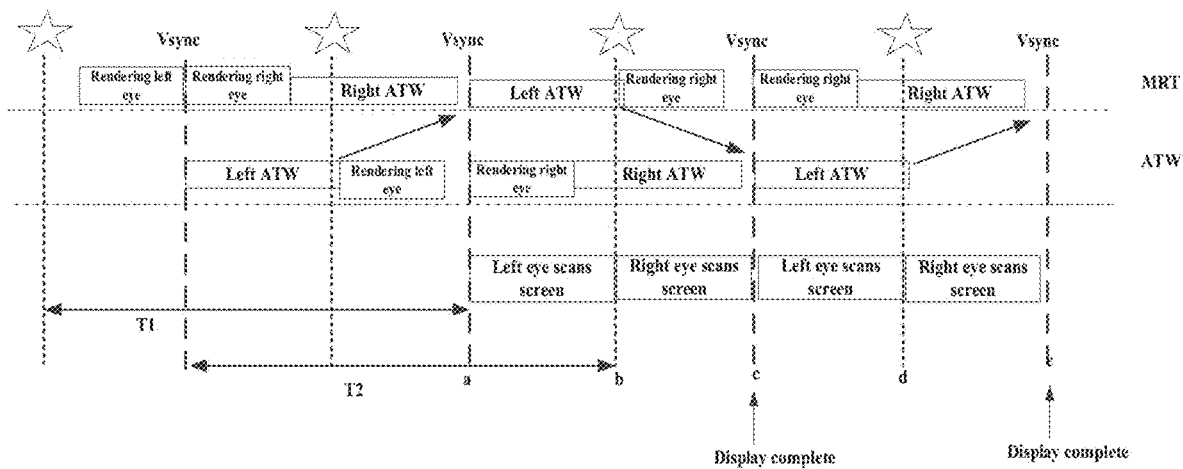
FIG. 7 is a schematic diagram of rendering threads and asynchronous time-warping thread operations according to an embodiment of the present disclosure.
Figure 8:
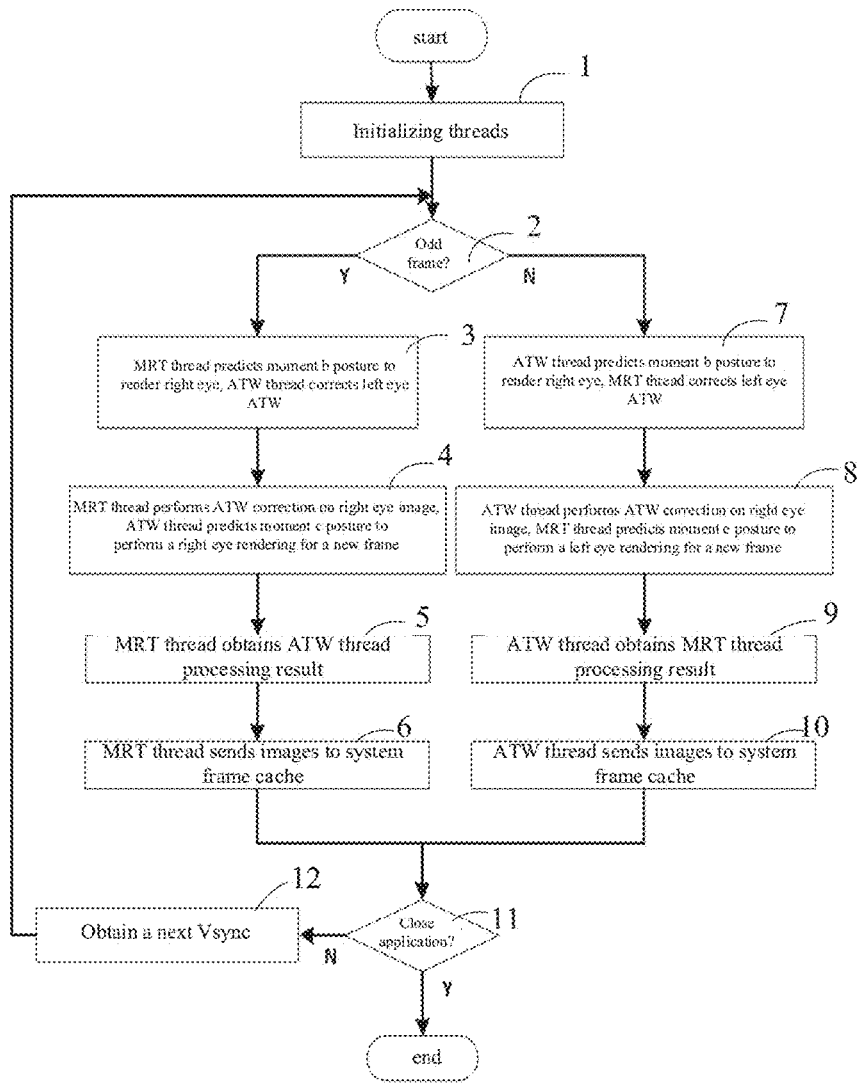
FIG. 8 is a schematic flow chart diagram illustrating a virtual reality display method according to an embodiment of the present disclosure.

In an embodiment, taking the first thread and the second thread selected from the MRT thread and the ATW thread as an example, as shown in FIGS. 7 and 8, the virtual reality display method includes the following steps:

step 1: initializing MRT and ATW threads, defining a counter VsyncBase for recording frame number, and performing the step 2;

step 2: judging whether the VsyncBase is an odd number, if so, performing the step 3, and if not, performing the step 7;

step 3: predicting the user posture at the moment b shown in FIG. 7 by the MRT thread through SensorPredicted and rendering a right-eye image, predicting the user posture at the moment a shown in FIG. 7 by the ATW thread based on SensorPredicted to perform left-eye ATW correction (the left-eye image is not rendered and is black in the first frame) at the moment a shown in FIG. 7, and performing step 4;

step 4: after rendering the right eye image, the MRT thread predicts the user posture at the moment b again and carries out ATW correction on the right eye image based on the prediction data at the moment; after the left eye image is corrected, the ATW thread transmits the left eye image to the MRT thread through the EyeBuffer to receive the right eye image after the ATW thread finishes processing the right eye operation, the ATW thread continues to perform left eye image rendering operation of a new frame based on the predicted user posture at the moment c, and the step 5 is executed;

step 5: after the MRT thread finishes the right-eye ATW correction, receiving the left-eye final display data transmitted by the ATW thread, and performing the step 6;

step 6: the MRT thread sends the left eye image and the right eye image to a system frame buffer for screen display, and step 11 is executed;

step 7: the ATW thread predicts the user posture at the moment d shown in the FIG. 7 through SensorPredicted and renders a right eye image, the MRT thread predicts the user posture at the moment c shown in the FIG. 7 based on SensorPredicted to perform left eye ATW correction, and step 8 is executed;

step 8: after the ATW thread renders the right eye image, predicting the user posture at the d moment again and carrying out ATW correction on the right eye image based on the prediction data at the d moment; after the left eye image is corrected, the MRT thread transmits the left eye image to the ATW thread through the eye buffer, receives the left eye image after the ATW thread processes the right eye, continues to perform left eye image rendering operation of a new frame based on the user posture predicted at the time e, and executes the step 9;

step 9: after completing the right-eye ATW correction, the ATW thread receives the left-eye final display data transmitted by the MRT thread, and the step 10 is executed;

step 10: the ATW thread sends the left eye image and the right eye image to a system frame buffer for screen display, and step 11 is executed;

step 11: judging whether the application is finished, if so, quitting the system, otherwise, performing the step 12;

step 12: waiting for the system Vsync signal, step 2 is performed when the next Vsync arrives.

As shown in FIG. 7, T1 represents a time span from the left-eye rendering time to the display time, T2 represents a time span from the right-eye rendering time to the display time, T1=1.5 frames, 1.5 frames<T2<2 frames in FIG. 3; t1<1.5 frame, T2=1.5 frame in FIG. 7; by comparison, the time delay between the rendering of the left eye image and the right eye image to the display is reduced.

In this embodiment, the ATW left-eye and right-eye correction time is about 35 ms, when the display data with the frame rate of 75 FPS is input, without using the technical solution of this embodiment, the output frame rate of the display data is about 20 FPS, and after using the technical solution of this embodiment, the average output frame rate of the display data can be increased to 70 FPS; when the display data with the frame rate of 60 FPS is input, after the technical scheme of the embodiment is used, the average output frame rate of the display data can reach 60 FPS. Namely, after the technical solution of the present embodiment is used, the output frequency after the display data is corrected is not lower than 90% of the input frequency of the display data.

According to the embodiment of the present disclosure, the possibility is provided for the requirement that a high-resolution VR system at the mobile terminal is added with complex algorithm processing to improve the display effect, and the performance condition of the system operation frame rate is obviously improved; the embodiment can reduce the tearing phenomenon of the high-resolution VR system at the mobile end, lighten the dizzy sense of a user when using a VR product, reduce the time delay from the rendering of a scene to the final output of the high-resolution VR system at the mobile end to improve the VR experience effect.

Further, the first screen display correction data and the second screen display correction data may also be subjected to an anti-distortion process before being output to the screen.

The anti-distortion process is a technique of correcting a distorted image into a normal image. In particular, in a virtual reality application scene, especially a head-mounted virtual display device, a lens may need to be installed in front of a display screen to obtain a larger field angle. The use of this lens brings about a greater field angle and also distortion of the displayed image. Therefore, the first screen display correction data and the second screen display correction data are used for displaying on the first screen and the second screen, and the first screen display correction data and the second screen display correction data need to be subjected to anti-distortion processing to eliminate the influence of the lens, so that the image seen by the user is more realistic.

Optionally, the anti-distortion processing may be at least one of vertex displacement based, mesh based, and fragment based.

For example, the fragment (pad)-based anti-distortion process solves the lens distortion problem by rendering pixels in the first and second screen scene images onto a texture by a second rendering, and then processing the texture with a fragment (pixel) shader (e.g., an associated routine in the android system) to move each pixel inward onto the center of the eye.

For example, the mesh-based antialiasing process no longer performs antialiasing on each pixel, but rather performs antialiasing on one or more vertices of the mesh, thereby increasing the rate of the antialiasing process.

For example, vertex displacement based antialiasing processes are performed faster by optimizing shaders (e.g., associated routines in the android system) to process display data without performing secondary rendering on the display data.

Generally, the adjustment manner and the adjustment matrix of the distortion network are the same or similar for the first screen and the second screen. Only one distortion network may need to be calculated for the first screen scene output data and the second screen scene output data. The distortion network is computed in one thread to perform the anti-distortion processing on the first screen scene output data and the second screen scene output data together for a shorter processing time than the separate anti-distortion processing of the first screen scene output data and the second screen scene output data, which is more beneficial to reducing image delay.

Figure 9:
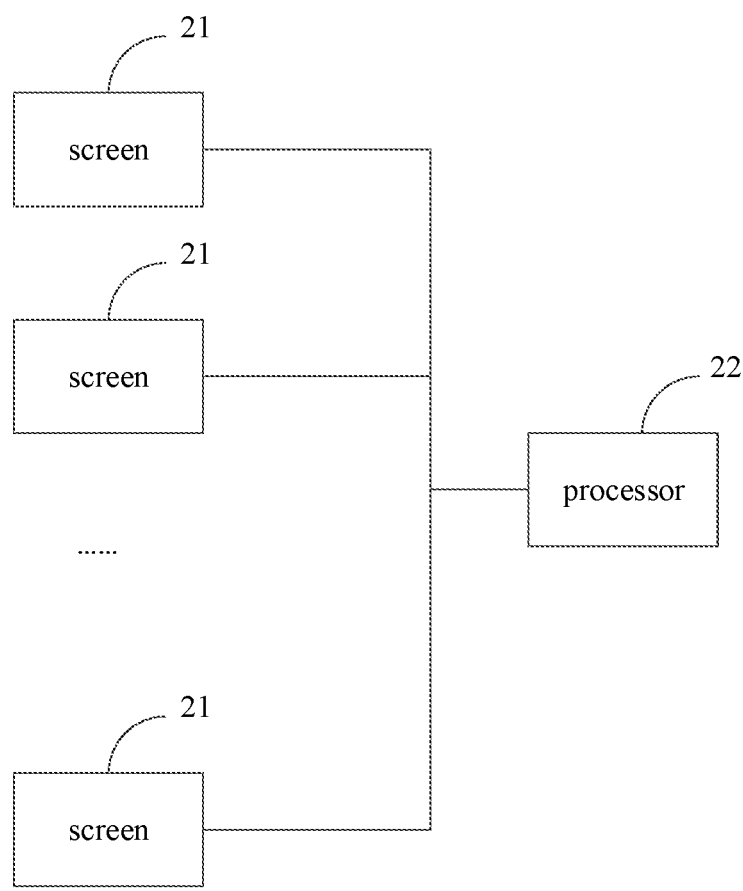
FIG. 9 is a schematic structural diagram of a virtual reality display device according to an embodiment of the disclosure.

An embodiment of the present disclosure further provides a virtual reality display device, as shown in FIG. 9, including:

a plurality of screens 21;

a processor 22 for rendering the display data of the plurality of screens in sequence by using one of the at least two threads; and after rendering the display data of the plurality of screens, correcting the rendered display data by using the at least two threads.

In this embodiment, after rendering the display data of multiple screens, the rendered display data is corrected by using at least two threads, instead of correcting the rendered display data by using one thread, so that the time of using multiple threads can be maximized, the performance of the current processor is fully utilized, and the frame drop phenomenon is greatly improved.

The at least two threads may include two threads or three threads or more, the multiple screens may include two screens or three screens or more, and the display data of the multiple screens are different from each other.

In this embodiment, the rendering of the display data of the multiple screens in sequence by using one thread of the at least two threads means that the processor 22 renders the display data of the first screen by using the thread, then renders the display data of the second screen, then renders the display data of the third screen, and so on, and then sequentially renders the display data of the multiple screens.

The virtual reality display method of the embodiment of the disclosure can comprise two threads running in parallel, namely a first thread and a second thread. For example, the virtual reality display method may be applied to a virtual reality display device or an augmented reality display device including a left-eye display screen and a right-eye display screen, such as a virtual display helmet, an augmented reality display helmet, and the like, which may further include a motion sensor such as a gyroscope, an acceleration sensor, and the like, a Central Processing Unit (CPU), a memory, an image processing unit (GPU), a communication device, and the like. The method may be executed, for example, by a central processing unit or an image processing unit for the virtual reality display device, which may employ various suitable operating systems, such as an android system, a Linux system, a Unix system, or a Windows (Windows) system, And the following takes the android system as an example, but the embodiment of the present disclosure is not limited thereto.

In an embodiment, the at least two threads include a first thread and a second thread, the multiple screens include a first screen and a second screen, and the processor 22 is further configured to execute the first thread to render the first screen display data and the second screen display data in sequence; after the first screen display data are rendered, the second thread is executed to correct the rendered first screen display data to obtain first screen display correction data; and after the second screen display data is rendered, executing the first thread to correct the rendered second screen display data to obtain second screen display correction data.

In this embodiment, the rendered first screen display data is not corrected until the first thread renders the second screen display data, but the second thread is executed to correct the rendered first screen display data after the first thread renders the first screen display data, and the first thread is executed to correct the rendered second screen display data after the first thread renders the second screen display data, so that the time of each frame of two threads can be maximally utilized, rendering and image correction are completed before image throwing operation of each frame, the performance of a current processor is fully utilized, and the frame drop phenomenon is greatly improved; and by adjusting the rendering starting time, the rendering time is shortened from the time when the rendered image is displayed, and the time delay between the rendering and the display of the image is reduced.

The first screen display data and the second screen display data are, for example, pre-stored image data read from a storage device, for example, for a virtual reality display device, the pre-stored image data includes image data of a corresponding application, for example, image data of a tour museum, a race track of a racing game, and the like.

Optionally, the first screen may be a screen displaying an image seen by the left eye of the user, and the second screen may be a screen displaying an image seen by the right eye of the user. The first screen display data may include various parameters of objects that should be presented in the field of view of the left eye of the user, and the second screen display data may include various parameters of objects that should be presented in the field of view of the right eye of the user. As described above, the meanings of the first screen and the second screen may be interchanged, and the first screen and the second screen may be various types of display screens, for example, a Liquid Crystal Display (LCD), an organic light emitting diode display (OLED), a Micro-LED display, or the like. These display devices implement refreshing of a display image of one frame by, for example, progressive scanning or the like.

In order to make the image presented by the virtual reality device be all objects that the user can observe in the visual field when the user uses the virtual reality device, all objects in the visual field of the user are generally rendered. Meanwhile, different images need to be presented to the left eye and the right eye of the user (i.e., parallax is formed), and then the brain of the user synthesizes the different images of the left eye and the right eye, so that the image with stereoscopic impression is presented to the user. Thus, the first screen display data and the second screen display data may differ in parameters for the same object. For example, the position of the object as viewed by the left and right eyes, and the refraction of light rays through the object to the left and right eyes may be different for the same object, and, therefore, in the present disclosure, both the first screen display data and the second screen display data are rendered. By adopting the mode, compared with the mode that the whole object is rendered firstly and then the rendering output result is output to the first screen and the second screen through affine transformation, the method can obtain more accurate images with stronger stereoscopic impression.

In this embodiment, the first thread and the second thread are selected from a rendering thread and a data correction thread, and the first thread is different from the second thread. Wherein the data correction thread may be the asynchronous time-warping described above.

Optionally, the rendering of the first screen display data and the second screen display data is a multi-render-target rendering.

The multi-render target rendering technique may save data of multiple pixels into different buffers (e.g., a buffer for color mapping, a buffer for normal mapping, and a buffer for depth mapping) so that these data become parameters of a subsequent lighting effect shader, so that the fineness of the output image is improved. By the multi-rendering-target rendering technology, the rendering of the illumination information can be delayed, and the rendering processing speed is improved. Meanwhile, since the first screen display data and the second screen display data are rendered respectively, it is necessary to store the pixel data of each object in the first screen display data and the second screen display data to the cache region, and then analyze the data in the illumination effect rendering process, thereby enhancing the illumination effect of the images displayed in the first screen and the second screen. Compared with the conventional method of respectively performing illumination coloring calculation on each pixel in the whole scene by using an illumination color machine, in the embodiment of the disclosure, the multiple rendering target rendering on the first screen display data and the second screen display data respectively can reduce the operation times of the illumination coloring calculation performed by the processor, and can obtain an image with enhanced illumination effect.

In this embodiment, the apparatus further includes:
a clock generator configured to generate a vertical synchronization signal;
the processor 22 is further configured to obtain a vertical synchronization signal, and execute the first thread and the second thread based on the vertical synchronization signal, where the first thread and the second thread may render the first screen display data and the second screen display data according to the vertical synchronization signal, so as to obtain a picture that a user wishes to see, and thus may increase the synchronicity of the first screen display and the second screen display.

Specifically, a Vertical synchronization (Vsync) signal is a synchronization signal applied between two frames to the display device, which indicates the end of the previous frame and the start of the next frame. This signal is active once before each frame scan, from which the field frequency of the display device, i.e. the number of refreshes of the screen per second, also referred to as the refresh frequency of the display device, can be determined. For example, the refresh frequency of the display device may be 60 Hz, 120 Hz, etc., i.e., 60, 120, etc. refreshes per second, with one display frame time being 1/60 seconds, 1/120 seconds, etc. The vertical synchronization signal is generated by a display driving device (e.g., a video card), and is used to synchronize a gate driving signal, a data signal, and the like required for displaying a frame of picture in a display process.

In some embodiments, the vertical synchronization signal sent by the system is divided into odd and even, and if the vertical synchronization signal is an odd-bit vertical synchronization signal, the first thread is a rendering thread; if the vertical synchronizing signal is an even-bit vertical synchronizing signal, the first thread is a data correction thread; or, if the vertical synchronization signal is an even-bit vertical synchronization signal, the first thread is a rendering thread; if the vertical synchronization signal is an odd-bit vertical synchronization signal, the first thread is a data correction thread.

Specifically, taking the data correction thread as an asynchronous time warping thread as an example, if the vertical synchronization signal is an odd-bit vertical synchronization signal, the first thread is a rendering thread, and the second thread is an asynchronous time warping thread; if the vertical synchronization signal is an even-bit vertical synchronization signal, the first thread is an asynchronous time warping thread, and the second thread is a rendering thread; when the vertical synchronization signal is an odd-numbered vertical synchronization signal, rendering the first screen display data and the second screen display data in sequence by using a rendering thread, after the first screen display data is rendered, correcting the rendered first screen display data by using an asynchronous time warping thread to obtain first screen display correction data, and after the second screen display data is rendered, performing the rendering thread to correct the rendered second screen display data to obtain second screen display correction data; if the vertical synchronizing signal is an even-bit vertical synchronization signal, an asynchronous time warping thread is executed to render the first screen display data and the second screen display data in sequence, after the first screen display data is rendered, the rendering thread is executed to correct the rendered first screen display data to obtain first screen display correction data, and after the second screen display data is rendered, the asynchronous time warping thread is executed to correct the rendered second screen display data to obtain second screen display correction data. Therefore, by adjusting the running mechanisms of the rendering thread and the asynchronous time warping thread, different processing operations are distributed to the MRT thread and the ATW thread in the odd-even frame, the time of each frame of the two threads is maximally utilized under the condition that the ATW exceeds the half frame time, rendering and image correction are completed before the image throwing operation of each frame, the performance of the current AP processor can be fully utilized, the frame dropping phenomenon shown in the FIG. 5 is improved to the maximum extent, and the rendering time is shortened from the rendering time to the display time of the rendered image by adjusting the starting time of the left and right rendering eyes.

In another specific example, the following may also be: if the vertical synchronization signal is an even-bit vertical synchronization signal, the first thread is a rendering thread, and the second thread is an asynchronous time warping thread; if the vertical synchronization signal is an odd-bit vertical synchronization signal, the first thread is an asynchronous time-warping thread, and the second thread is a rendering thread. When the vertical synchronization signal is an even-bit vertical synchronization signal, rendering the first screen display data and the second screen display data in sequence by using the rendering thread, after the first screen display data is rendered, correcting the rendered first screen display data by using the asynchronous time warping thread to obtain first screen display correction data, and after the second screen display data is rendered, performing the rendering thread to correct the rendered second screen display data to obtain second screen display correction data; if the vertical synchronizing signal is an odd-numbered vertical synchronizing signal, an asynchronous time warping thread is executed to render the first screen display data and the second screen display data in sequence, after the first screen display data is rendered, the rendering thread is executed to correct the rendered first screen display data to obtain first screen display correction data, and after the second screen display data is rendered, the asynchronous time warping thread is executed to correct the rendered second screen display data to obtain second screen display correction data. Therefore, by adjusting the running mechanisms of the rendering thread and the asynchronous time warping thread, different processing operations are distributed to the MRT thread and the ATW thread in the odd-even frame, the time of each frame of the two threads is maximally utilized under the condition that the ATW exceeds the half frame time, rendering and image correction are completed before the image throwing operation of each frame, the performance of the current AP processor can be fully utilized, the frame dropping phenomenon shown in the FIG. 5 is improved to the maximum extent, and the rendering time is shortened from the rendering time to the display time of the rendered image by adjusting the starting time of the left and right rendering eyes.

In this embodiment, the ATW left-eye and right-eye correction time is about 35 ms, when the display data with the frame rate of 75 FPS is input, without using the technical solution of this embodiment, the output frame rate of the display data is about 20 FPS, and after using the technical solution of this embodiment, the average output frame rate of the display data can be increased to 70 FPS; when the display data with the frame rate of 60 FPS is input, after the technical scheme of the embodiment is used, the average output frame rate of the display data can reach 60 FPS. Namely, after the technical solution of the present embodiment is used, the output frequency after the display data is corrected is not lower than 90% of the input frequency of the display data.

In some embodiments, the processor 22 is further configured to execute the second thread to send the first screen display correction data to the first thread. The first thread can obtain the second screen display correction data and the first screen display correction data so as to output the second screen display correction data and the first screen display correction data to the display screen for display.

In some embodiments, the processor 22 is further configured to execute the first thread to send the first screen display correction data and the second screen display correction data to a display buffer for screen display. In some embodiments, the first thread and the second thread are performed in parallel to obtain the first screen display correction data and the second screen display correction data. Therefore, the total running time of the rendering thread and the asynchronous time warping thread can be further reduced, the rendering time is shortened from the time when the rendered image is displayed, and the delay problem is relieved.

In some embodiments, the executing the first thread to render the first screen display data and the second screen display data sequentially further includes:

first user pose data after a first predetermined amount of time for a display refresh frame is predicted, and rendering is performed based on the first user pose data to obtain the rendered first and second screen display data.

The above-mentioned prediction operation may be, for example, by analyzing motion data fed back by a motion sensor such as an acceleration sensor, a gyroscope, or the like, obtaining a motion state of the head of the user at present, such as a motion direction, a velocity, an acceleration, or the like, and further predicting a position that the user will reach at a next predetermined time point, thereby predicting an image that the user will see. For example, the first user pose data, as well as other user pose data referred to in the description below, may include one or a combination of direction and angle in which the user is facing, direction and angle of motion, velocity, acceleration, and the like. For example, in the embodiment of the present disclosure, the prediction operation may be performed by calculating or predicting the user gesture after a given time according to the current user gesture and the historical data of the user gesture, so as to obtain the user gesture data of the time to be displayed. Methods of calculation or prediction include, but are not limited to, prediction using neural networks.

Optionally, the first predetermined amount of display refresh frames is N+0.5 display refresh frames, where N is greater than or equal to 1. Here, the term "display refresh frame" refers to a frame of the corresponding display device during the scanning process for displaying, and is also referred to as "frame" hereinafter.

The value of N may be different based on a statistical result of rendering time and Asynchronous Time Warping (ATW) processing time for one frame of a display screen of a currently used virtual reality device. The values of N mentioned above are only examples. The value of N may be a fixed value determined according to the performance of the CPU, and may also be dynamically adjusted based on the actual usage of the current virtual reality device. For example, in the case where the CPU of the virtual reality device is computationally expensive and/or other threads occupy significant CPU resources, the rendering thread may take longer to process. In such a case, the value of N may be dynamically adjusted to a larger value so that the rendered display data is closer to the time at which it should be displayed. Similarly, the value of N may be dynamically adjusted to a smaller value when the amount of computation of the CPU of the virtual reality device is smaller and/or other threads occupy smaller CPU resources.

In some embodiments, the processor 22 is further configured to predict second user pose data for a beginning node of a display frame of the first screen display data and the second screen display data and third user pose data for an ending node of the display frame; executing the second thread to correct the rendered first screen display data includes: correcting the rendered first screen display data based on the second user posture data and the third user posture data to obtain first screen display correction data; executing the first thread to correct the rendered second screen display data includes: and correcting the rendered second screen display data based on the second user posture data and the third user posture data to obtain second screen display correction data.

In some embodiments, the processor 22 is further configured to interpolate the second user pose data and the third user pose data to obtain first asynchronous time warp correction reference data, and then correct the rendered first screen display data and second screen display correction data based on the first asynchronous time warp correction reference data. Therefore, the scene images output by the first screen and the second screen are closer to the picture expected by the user, and the tearing feeling of the picture is reduced.

The devices provided by the present disclosure may include, but are not limited to, smart phones, tablets, media players, and the like. It should be noted that the overall structure of the device is not shown for clarity. Other structures not shown can be set by those skilled in the art according to the specific application scenario to realize the necessary functions of the apparatus, and the disclosure is not limited thereto.

There is also provided, in accordance with some embodiments of the present disclosure, a virtual reality display device, including a processor and a memory, on which are stored computer program instructions. The computer executable instructions, when executed by a computer, may implement a virtual reality display method in accordance with embodiments of the present disclosure.

There is also provided, in accordance with some embodiments of the present disclosure, a computer-readable storage medium storing computer-executable instructions that, when executed by a processor, perform a virtual reality display method as described above.

The computer readable storage medium can be any combination of one or more computer readable storage media, e.g., one containing computer readable program code for randomly generating a sequence of action instructions and another containing computer readable program code for performing face activity recognition.

In general, the various example embodiments of this disclosure may be implemented in hardware or special purpose circuits, software, firmware, logic or any combination thereof. Certain aspects may be implemented in hardware, while other aspects may be implemented in firmware or software which may be executed by a controller, microprocessor or other computing device. While aspects of embodiments of the disclosure have been illustrated and described as block diagrams, flow charts, or using some other pictorial representation, it is well understood that the blocks, apparatus, systems, techniques or methods described herein may be implemented in, as non-limiting examples, hardware, software, firmware, special purpose circuits or logic, general purpose hardware or controller or other computing devices, or some combination thereof.

The processor in the disclosed embodiments may be an integrated circuit chip having signal processing capabilities. The processor may be a general purpose processor, a Digital Signal Processor (DSP), an Application Specific Integrated Circuit (ASIC), an off-the-shelf programmable gate array (FPGA) or other programmable logic device, discrete gate or transistor logic, discrete hardware components. The various methods, steps, and logic blocks disclosed in the embodiments of the present application may be implemented or performed. The general purpose processor may be a microprocessor, or the processor may be any conventional processor or the like, either of the X86 architecture or the ARM architecture.

The computer readable storage media in the disclosed embodiments may be either volatile memory or nonvolatile memory, or may include both volatile and nonvolatile memory. The non-volatile memory may be read-only memory (ROM), programmable read-only memory (PROM), erasable programmable read-only memory (EPROM), electrically erasable programmable read-only memory (EEPROM), or flash memory. Volatile memory can be Random Access Memory (RAM), which acts as external cache memory. By way of example, and not limitation, many forms of RAM are available, such as Static Random Access Memory (SRAM), Dynamic Random Access Memory (DRAM), Synchronous Dynamic Random Access Memory (SDRAM), Double Data Rate Synchronous Dynamic Random Access Memory (DDRSDRAM), Enhanced Synchronous Dynamic Random Access Memory (ESDRAM), Synchronous Link Dynamic Random Access Memory (SLDRAM), and direct memory bus random access memory (DR RAM). It should be noted that the memory of the systems and methods described herein is intended to comprise, without being limited to, these and any other suitable types of memory.

In the embodiments of the methods of the present disclosure, the sequence numbers of the steps are not used to limit the sequence of the steps, and for those skilled in the art, the sequence of the steps is not changed within the protection scope of the present disclosure without creative efforts.

It should be noted that, in this specification, each embodiment is described in a progressive manner, and the same and similar parts between the embodiments are referred to each other, and each embodiment focuses on the differences from other embodiments. In particular, for the embodiments, since they are substantially similar to the product embodiments, the description is simple, and reference may be made to the partial description of the product embodiments for relevant points.

The above description is only for the specific embodiments of the present disclosure, but the scope of the present disclosure is not limited thereto, and any person skilled in the art can easily think of the changes or substitutions within the technical scope of the present disclosure, and shall cover the scope of the present disclosure. Therefore, the scope of the present disclosure should be subject to the scope of the claims.

The invention claimed is:

1. A virtual reality display method, comprising:
rendering display data of a plurality of screens in sequence by utilizing one thread of at least two threads;
after rendering the display data of the plurality of screens, correcting the rendered display data by using the at least two threads;
wherein an output frequency of the display data after correction is not less than 90% of an input frequency of the display data.

2. The virtual reality display method according to claim 1, wherein the at least two threads comprise a first thread and a second thread, the plurality of screens comprise a first screen and a second screen, and the method further comprises:

executing the first thread to render the first screen display data and the second screen display data in sequence rendering by;
after rendering the first screen display data, executing the second thread to correct the rendered first screen display data to obtain first screen display correction data; and after rendering the second screen display data, executing the first thread to correct the rendered second screen display data to obtain second screen display correction data.

3. The virtual reality display method according to claim 2, wherein
the first thread and the second thread are selected from a rendering thread and a data correction thread, and the first thread is different from the second thread.

4. The virtual reality display method according to claim 3, wherein before executing the first thread to render the second screen display data, the method further comprises:
acquiring a vertical synchronization signal;
if the vertical synchronizing signal is an odd-bit vertical synchronizing signal, the first thread is a rendering thread; if the vertical synchronizing signal is an even-bit vertical synchronizing signal, the first thread is a data correction thread; or
if the vertical synchronizing signal is an even-bit vertical synchronizing signal, the first thread is a rendering thread; if the vertical synchronization signal is an odd-bit vertical synchronization signal, the first thread is a data correction thread.

5. The virtual reality display method according to claim 2, wherein after the executing the second thread to correct the rendered first screen display data and obtain first screen display correction data, the method further comprises:
executing the second thread to send the first screen display correction data to the first thread.

6. The virtual reality display method according to claim 5, wherein after the executing the second thread to send the first screen display correction data to the first thread, the method further comprises:
executing the first thread to send the first screen display correction data and the second screen display correction data to a display cache for screen display.

7. The virtual reality display method according to claim 2, wherein the first thread and the second thread are executed in parallel to obtain the first screen display correction data and the second screen display correction data.

8. The virtual reality display method according to claim 7, wherein the rendering of the first screen display data and the second screen display data is a multi-render-target rendering.

9. The virtual reality display method according to claim 7, wherein the executing the first thread to render the first screen display data and the second screen display data in sequence further comprises:
predicting first user pose data after a first predetermined amount of time for a display refresh frame, and performing a rendering based on the first user pose data to obtain the rendered first and second screen display data.

10. A virtual reality display device, comprising:
a plurality of screens;
a processor, configured to:
render display data of a plurality of screens in sequence by utilizing one thread of at least two threads; and
after rendering the display data of the plurality of screens, correct the rendered display data by using the at least two threads;

wherein an output frequency of the display data after correction is not less than 90% of an input frequency of the display data.

11. The virtual reality display device according to claim 10, wherein the at least two threads comprise a first thread and a second thread, the plurality of screens comprise a first screen and a second screen, the processor is further configured to execute the first thread to render the first screen display data and the second screen display data in sequence; after the first screen display data are rendered, execute the second thread to correct the rendered first screen display data to obtain first screen display correction data; and after the second screen display data is rendered, execute the first thread to correct the rendered second screen display data to obtain second screen display correction data.

12. The virtual reality display device according to claim 11, further comprising:

a clock generator configured to generate a vertical synchronization signal;

the processor is further configured to obtain the vertical synchronization signal, execute the first thread and the second thread based on the vertical synchronization signal, and if the vertical synchronization signal is an odd-numbered vertical synchronization signal, the first thread is a rendering thread; if the vertical synchronizing signal is an even-bit vertical synchronizing signal, the first thread is a data correction thread; or, if the vertical synchronization signal is an even-bit vertical synchronization signal, the first thread is a rendering thread; if the vertical synchronization signal is an odd-bit vertical synchronization signal, the first thread is a data correction thread.

13. The virtual reality display device according to claim 11, the processor is further configured to execute the second thread to send the first screen display correction data to the first thread.

14. The virtual reality display device according to claim 13, the processor is further configured to execute the first thread to send the first screen display correction data and the second screen display correction data to a display cache for screen display.

15. A virtual reality display device, comprising: a processor and a memory, wherein the memory stores computer-executable instructions, wherein the processor executes the computer-executable instructions to perform the virtual reality display method according to claim 1.

16. A non-transitory computer-readable storage medium storing computer-executable instructions, wherein the computer-executable instructions are executed by a processor to perform the virtual reality display method according to claim 1.

* * * * *